US012325303B2

United States Patent
Hagen et al.

(10) Patent No.: US 12,325,303 B2
(45) Date of Patent: Jun. 10, 2025

(54) OPERATING UNIT FOR A VEHICLE

(71) Applicant: BEHR-HELLA THERMOCONTROL GMBH, Lippstadt (DE)

(72) Inventors: Andreas Hagen, Lippstadt (DE); Udo Treuguth, Lippstadt (DE)

(73) Assignee: BEHR-HELLA THERMOCONTROL GMBH, Lippstadt (DE)

( * ) Notice: Subject to any disclaimer, the term of this patent is extended or adjusted under 35 U.S.C. 154(b) by 724 days.

(21) Appl. No.: 17/612,408

(22) PCT Filed: May 25, 2020

(86) PCT No.: PCT/EP2020/064442
§ 371 (c)(1),
(2) Date: Nov. 18, 2021

(87) PCT Pub. No.: WO2020/239695
PCT Pub. Date: Dec. 3, 2020

(65) Prior Publication Data
US 2022/0219540 A1    Jul. 14, 2022

(30) Foreign Application Priority Data
May 24, 2019   (DE) .................. 10 2019 114 002.1

(51) Int. Cl.
*B60K 35/50*   (2024.01)
*B60K 35/10*   (2024.01)
(Continued)

(52) U.S. Cl.
CPC ............. *B60K 35/50* (2024.01); *B60K 35/10* (2024.01); *B60R 11/0235* (2013.01);
(Continued)

(58) Field of Classification Search
CPC ........ B60K 35/50; B60K 35/10; B60K 35/22; B60K 2360/691; B60K 2360/693;
(Continued)

(56) References Cited

U.S. PATENT DOCUMENTS 5,873,749 A   2/1999  Takiguchi et al.
6,282,751 B1  9/2001  Thometschek et al.
(Continued)

FOREIGN PATENT DOCUMENTS

CN       1655979 A    8/2005
CN    103 781 649 A   5/2014
(Continued)

OTHER PUBLICATIONS

International Search Report (PCT/ISA/210) issued in PCT Application No. PCT/EP2020/064442 dated Sep. 2, 2020 with English Translation.
(Continued)

*Primary Examiner* — Pinel E Romain
(74) *Attorney, Agent, or Firm* — BakerHostetler

(57) ABSTRACT

The operating unit (10) for a vehicle is provided with a housing (12) with a front panel (14), which has a recess (16), a display (24) arranged in the housing (12) and having a display area (26), and a fastening device (36) for fastening the display (24) in the housing (12). The fastening device (36) has a holding part (28) for the display (24), which is arranged in the housing (12) so as to be pivotable between a preassembly position and an installation position. The housing (12) also has at least one bearing axle (40). The holding part (28) has at least one bearing shell assembly (32) having at least two gripping-around protrusions (48, 50) for mounting on the bearing axle (40). The bearing axle (40) has a circumferential area along the longitudinal extent and in at least one mounting portion (57) with an outer contour which
(Continued)

Figure 1:
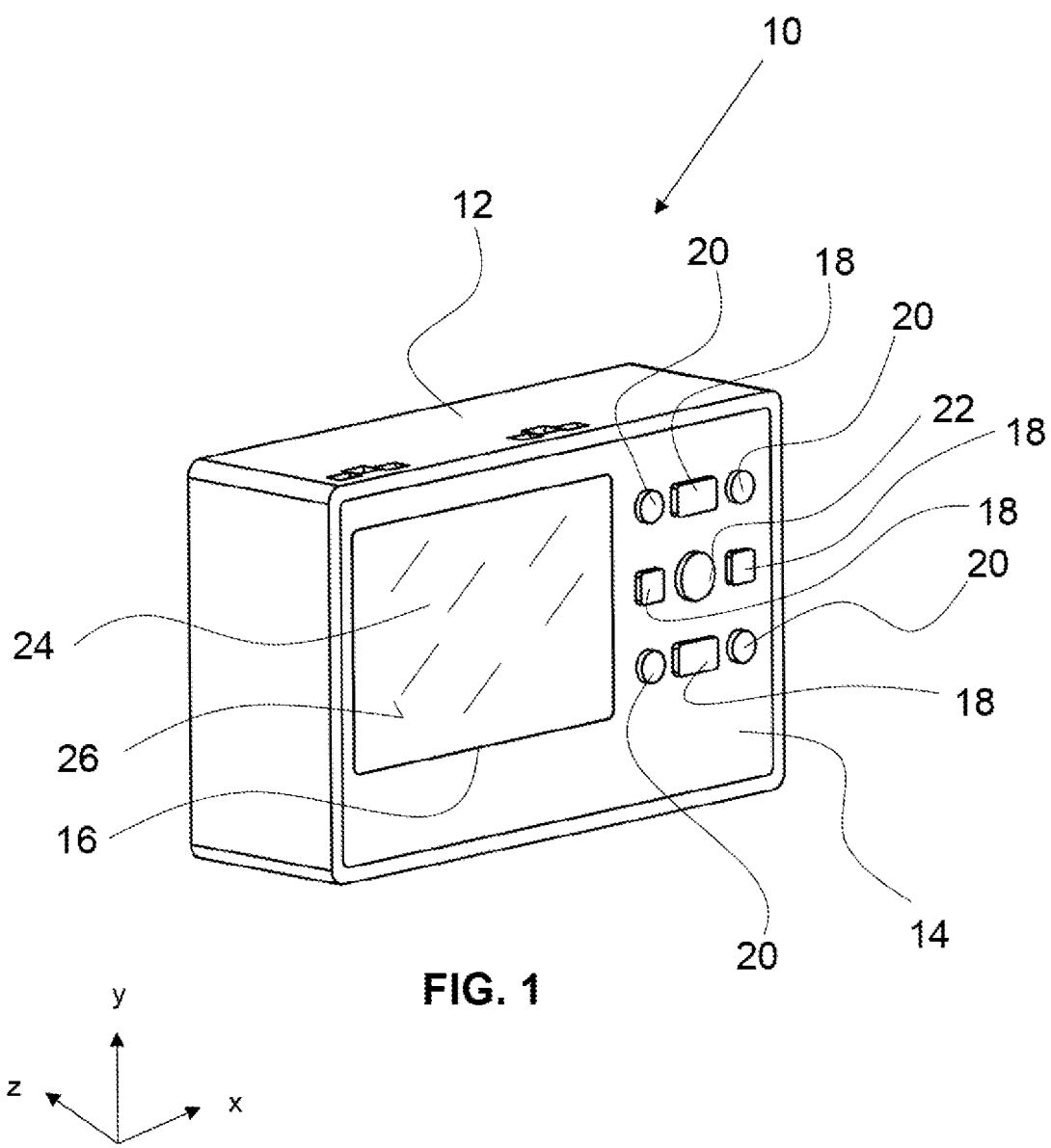

deviates from a shape complementary to the bearing shell area (52) of the gripping-around protrusions (48, 50) of the at least one bearing shell assembly (32). The bearing axle (40) is also arranged in the housing (12) so as to be oriented in such a way that the at least one bearing shell assembly (32) can be mounted on the bearing axle (40) in the preassembly position of the holding part (28) and, starting from the preassembly position, is pivotable into the installation position. The installation position of the holding part (28) is defined by bearing parts (60, 34) of the housing (12) and holding part (28) abutting on each other. The fastening device also has at least one fastening element (58) for fixing the holding part (28) in its installation position in and/or on the housing (12).

12 Claims, 10 Drawing Sheets

(51) Int. Cl.
  *B60R 11/02* (2006.01)
  *B60K 35/22* (2024.01)
(52) U.S. Cl.
  CPC ........ *B60K 35/22* (2024.01); *B60K 2360/691* (2024.01); *B60K 2360/693* (2024.01); *B60K 2360/834* (2024.01); *B60K 2360/84* (2024.01); *B60K 2360/96* (2024.01)
(58) Field of Classification Search
  CPC .......... B60K 2360/834; B60K 2360/84; B60K 2360/96; B60K 2360/816; B60K 2360/822; B60K 35/00; B60K 37/06; B60R 11/0235; E05Y 2900/606; B60H 1/0065; E05D 7/1072

USPC ...................................................... 296/70, 72
  See application file for complete search history.

(56) References Cited

U.S. PATENT DOCUMENTS

| | | | |
|---|---|---|---|
| 6,854,400 | B2 | 2/2005 | Sullivan |
| 7,116,559 | B2 * | 10/2006 | Davis, Jr. ............... B60K 35/60 |
| | | | 361/740 |
| 7,549,380 | B2 * | 6/2009 | Sullivan ................ E05D 7/1077 |
| | | | 16/249 |
| 9,227,513 | B2 * | 1/2016 | Isquierdo ............. H05K 5/0226 |
| 10,260,262 | B2 | 4/2019 | Jiang |
| 2013/0112701 | A1 | 5/2013 | Wu et al. |
| 2014/0347796 | A1 | 11/2014 | Isquierdo et al. |
| 2017/0342753 | A1 | 11/2017 | Jiang |

FOREIGN PATENT DOCUMENTS

| | | |
|---|---|---|
| CN | 105 909 099 A | 8/2016 |
| DE | 10 2004 040 038 A1 | 6/2005 |
| DE | 10 2012 219 286 A1 | 4/2014 |
| DE | 10 2015 111 269 A1 | 1/2017 |
| DE | 10 2017 109 022 A1 | 10/2018 |
| JP | 11338375 A * | 12/1999 |

OTHER PUBLICATIONS

Written Opinion (PCT/ISA/237) issued in PCT Application No. PCT/EP2020/064442 dated Sep. 2, 2020.
First Office Action issued in Chinese Patent Application No. Application No. 202080036736.8 dated Jul. 22, 2023, with English translation.

* cited by examiner

OPERATING UNIT FOR A VEHICLE

CROSS-REFERENCE OF RELATED APPLICATIONS

This application is the U.S. National Phase under 35 U.S.C. § 371 of International Patent Application No. PCT/EP2020/064442, filed on May 25, 2020, which claims the benefit of German Patent Application No. 10 2019 114 002.1, filed on May 24, 2019, the entire disclosures of each are incorporated by reference herein.

The present invention claims priority of the national German patent application 10 2019 114 002.1 of 24 May 2019 the contents of which is incorporated here by reference.

The invention relates to an operating unit for a vehicle, and in particular to a man-machine interface for a vehicle or a vehicle component, such as a heating, ventilating and/or air conditioning system, an infotainment system, a navigation device or the like, for example.

Operating units for vehicles, such as air conditioning control unit for vehicles, for example, are partially automatically assembled from a plurality of individual components. A display which is either configured as a display device or additionally for inputting commands becomes to an increasing extent an essential component of such operating units. In the latter case, the display is configured as a touchscreen. Besides a touchscreen, the operating unit can also comprise other manually actuated operating elements, such as a rotary controller, a rotary/push controller or operating keys of different configurations.

Various installation methods for installing displays in vehicle holding fixtures are described in DE-A-10 2012 219 286, DE-A-10 2015 111 269 and DE-A-10 2017 109 022

It is an object of the invention to simplify the assembly of an operating unit in particular with regard to fastening a display to the operating unit.

According to the invention, for achieving this object, an operating unit for a vehicle, in particular a man-machine interface e.g. for a vehicle component, such as a heating, ventilating and/or air conditioning system, an infotainment system, a navigation device, or the like is proposed, wherein the operating unit is provided with a housing having a front panel comprising a recess,
a display accommodated in the housing and having a display area which is arranged in the or behind the recess, and
a fastening device for fastening the display in the housing,
wherein the fastening device comprises a holding part holding the display,
wherein the holding part is arranged in the housing so as to be pivotable between a preassembly position and an installation position in which the display is located in the or behind the recess of the front panel,
wherein the housing—or alternatively the holding part—comprises a bearing axle which is constituted by a least one bar arranged in the housing,
wherein the holding part—or alternatively the housing—comprises at least one bearing shell assembly having at least two gripping-around protrusions adapted to be mounted on the bar, which gripping-around protrusions define a circular-cylindrical bearing shell area for abutting on the at least one bar, said bearing shell area extending over more than 180° and less than 270° and defining a mounting opening for mounting the bearing shell assembly on the bar,
wherein the bar comprises, along its longitudinal extension, in at least one mounting portion a circumferential area having an outer contour which deviates from the shape complementary to the bearing shell area of the gripping-around protrusions of the at least one bearing shell assembly,
wherein the bar is arranged in the housing—or alternatively the at least one bearing shell assembly at the holding part—so as to be oriented in such a way that the at least one bearing shell assembly, in the preassembly position of the holding part, is adapted to be mounted on the mounting portion of the bar and is pivotable from the preassembly position into the installation position in which the at least one bearing shell assembly grips around the bar within its mounting portion so as to be undetachable,
wherein the installation position of the holding part is defined by abutting elements of the housing and the holding part, with the abutting elements abutting on each other, and
wherein the fastening device comprises at least one fastening element for fixing the holding part, in its installation position, in and/or at the housing.

Accordingly, the invention proposes to configure a holding part of the fastening device holding or accommodating the display of the operating unit such that the former can be mounted on the bearing axle for pivoting the holding part from a preassembly position in which it is mounted on the bearing axle into an installation position in which the display is located in the desired position behind a recess of the front panel of the housing of the operating unit, for example.

In detail, the operating unit according to the invention comprises a housing having a front panel in which a recess for the display is provided. The display comprises a display area which, in the installation position of the display, is arranged in the or behind the recess of the front panel. A fastening device serves for fastening the display in the housing. Said fastening device comprises a holding part for the display and a bearing axle arranged at or in the housing—or alternatively at the holding part. This bearing axle is constituted by at least one bar-shaped part fixedly arranged in the housing or at the holding part, which bar-shaped part preferably is similar to a round bar. Hereunder the bar-shaped part is referred to as a bar.

As stated above, the holding part can be pivoted from its assembly position into the installation position. The fastening device further includes, besides the holding part and the bearing axle or the at least one bar-shaped element (for the sake of convenience referred to hereunder as "bar" or "bars"), a bearing shell assembly cooperating with the bearing axle thus constituting a separable hinge. For this purpose, the at least one bar comprises, along its extension, a mounting portion where the shell bearing assembly is adapted to be mounted on the bar when the holding part is in the preassembly position. The bearing shell assembly comprises at least two gripping-around protrusions for gripping around the bar, wherein the at least two gripping-around protrusions define a circular-cylindrical bearing shell area for abutting on the bar. Between the two gripping-around protrusions a mounting opening is located such that the two gripping-around protrusions define a circular-cylindrical bearing shell area preferably extending over more than 180° and less than 270° in the circumferential direction. The gripping-around protrusions need not continuously define this bearing shell area; however, in sections the gripping-around protrusions comprise surface areas which extend along the contour of the circular-cylindrical bearing shell area and partly define or delimit the latter.

In other words, the bearing shell assembly has a C-shaped configuration as see in the side view. The bearing shell assembly can be mounted on the mounting portion of the bar through the mounting opening of this C-shaped configuration so as to be pivoted relative to the bar from this position, which is also the preassembly position of the holding part, into the installation position of the holding part. In the installation position of the holding part the bearing shell assembly and respectively the gripping-around protrusions of the bearing shell assembly are secured at the bar so as to be undetachable. The installation position is further defined by abutting elements of the housing and the holding part. Finally, the holding part can be fixed to the housing at these abutting elements by a fastening element, for example.

An essential advantage of the operating unit according to the invention is the simple assembly of the display. In relation to a three-dimensional coordinate system with an extension of the X-axis along the bar, an extension of the Y-axis orthogonally to the latter as well as in parallel to the front panel, and with an extension of the Z-axis orthogonally to both (and thus e.g. into the housing), the positioning of the display in the extension of the Y-axis is thus defined by the bar and the bearing shell assembly, while the positioning in the Z-axis is determined by the abutment element, namely by the comparably easy-to-realize assembly process described above (fixing by fastening the holding part to the housing subsequent to the previous mounting of the bearing shell assembly on the bar constituting the bearing axle by pivoting the holding element from this preassembly position into the installation position).

Besides the aforementioned component parts of the operating unit according to the invention, the latter can also comprise further operating elements, such as keys, rotary controllers, push buttons, rotary buttons etc.

Within its accommodation portion the bar has an outer contour deviating from the circular-cylindrical circumferential area, as described above. Here, the outer contour of the bar in the mounting portion extends up to the circular-cylindrical circumferential area or is receding relative to the latter. The bar is oriented such that, with the holding part in the preassembly position, the gripping-around protrusions of the at least one bearing shell assembly can be mounted on the mounting portion of the bar. For example, the bar comprises one or a plurality of flattened portions in their mounting portion, wherein, advantageously, when two flattened portions are provided, these are arranged diametrally opposite to each other. Alternatively, it is also possible that the bar has a multiple-polygonal outer contour without the individual portions of the circumferential area having to extend in a circular-cylindrical manner. Thus, the bar can have a rectangular or square configuration in its mounting portion, for example, wherein the diagonal is essentially equal to the diameter defining the circular-cylindrical bearing shell area of the bearing shell assembly. In other words, in this variant of the bar described last, the longest distance line, extending through the center axis of the bar, between two opposite outer corners of the polygonal circumferential area is equal to or essentially equal to the diameter defined by the circular-cylindrical bearing shell area of the bearing shell assembly.

Each bar-shaped part can have a continuous configuration or comprise individual portions separated from each other and being aligned with each other in the extension of the bearing axle, wherein the individual portions respectively comprise one of the flattened portions or a plurality of flattened portions.

As stated above, the gripping-around protrusions of the at least one bearing shell assembly are essentially configured as a C-shaped bearing shell assembly, as seen in the extension of the bearing axle. Here, the gripping-around protrusions define the mounting opening at their free ends, which mounting opening has a width which is larger than or equal to the thickness of the bar in its mounting portion, when viewing the bar from the side in the mounting direction of the holding part when the latter, in its preassembly position, is placed on the bearing axle.

According to another advantageous implementation of the invention, it is provided that the gripping-around protrusions of the at least one bearing shell assembly are arranged opposite to each other and that at least one pair of such gripping-around protrusions exists.

Alternatively or additionally to a bearing shell assembly having two opposite gripping-around protrusions, a bearing shell assembly can comprise three gripping-around protrusions, for example, wherein two first gripping-around protrusions are laterally and axially offset from each other relative to a common side of the bearing axle, while the remaining one second gripping-around protrusion is arranged diametrally opposite to the two first gripping-around protrusions, namely between the two first gripping-around protrusions leaving a gap between them.

According to another advantageous implementation of the invention, the operating unit can be provided with a positioning element assembly for positioning the holding element and the housing relative to each other in the longitudinal extension of the bar when the holding part assumes its installation position, wherein the positioning element assembly comprises, at the housing—or alternatively at the holding part —, two bearing shell areas facing each other between which, in the installation position of the holding part, an axial positioning protrusion arranged at the holding part—or alternatively at the housing—can be immersed. The positioning element assembly enables the holding part to also be fixed in the longitudinal direction of the bearing axle, i.e. in relation to the coordinate axes described above, in the extension of the X-axis and in the installation position. Thus, in the installation position the holding part and the display held by the holding part are definedly positioned in all three spatial directions which are perpendicularly to each other.

Advantageously, in the device according to the invention, it can further be provided that the bearing axle is defined by two bars aligned with each other, wherein gripping-around protrusions of a bearing shell assembly are associated with each bar, and/or that the installation position of the holding part is defined by two pairs of cooperating abutment elements at the holding part and the housing.

For supporting the orientation of the holding part relative to the housing, when the gripping-around protrusions of the bearing shell assembly are mounted on the at least one bar for the holding part to assume the preassembly position, the operating unit can further comprise cooperating guiding areas.

Figure 2:
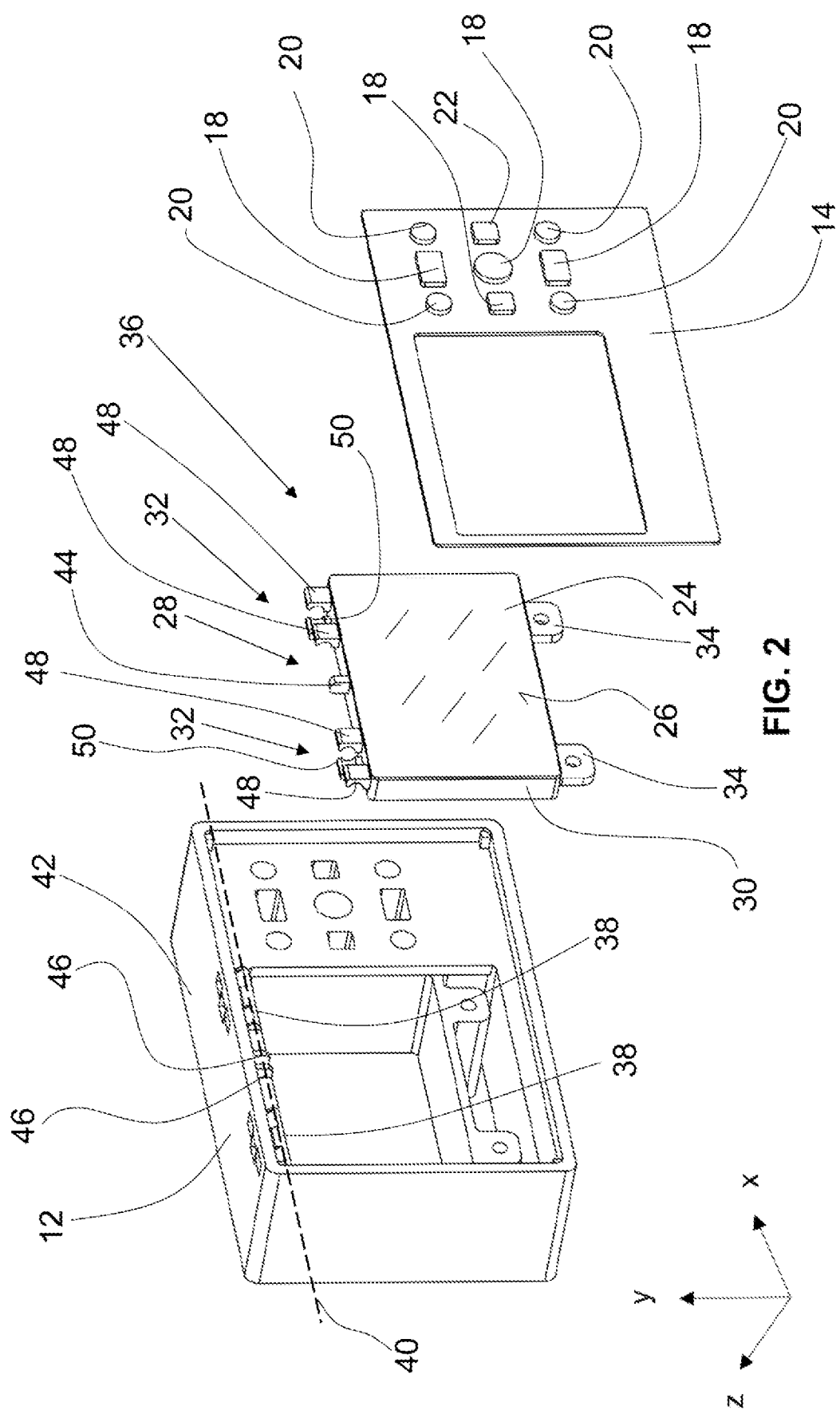
Figure 9:
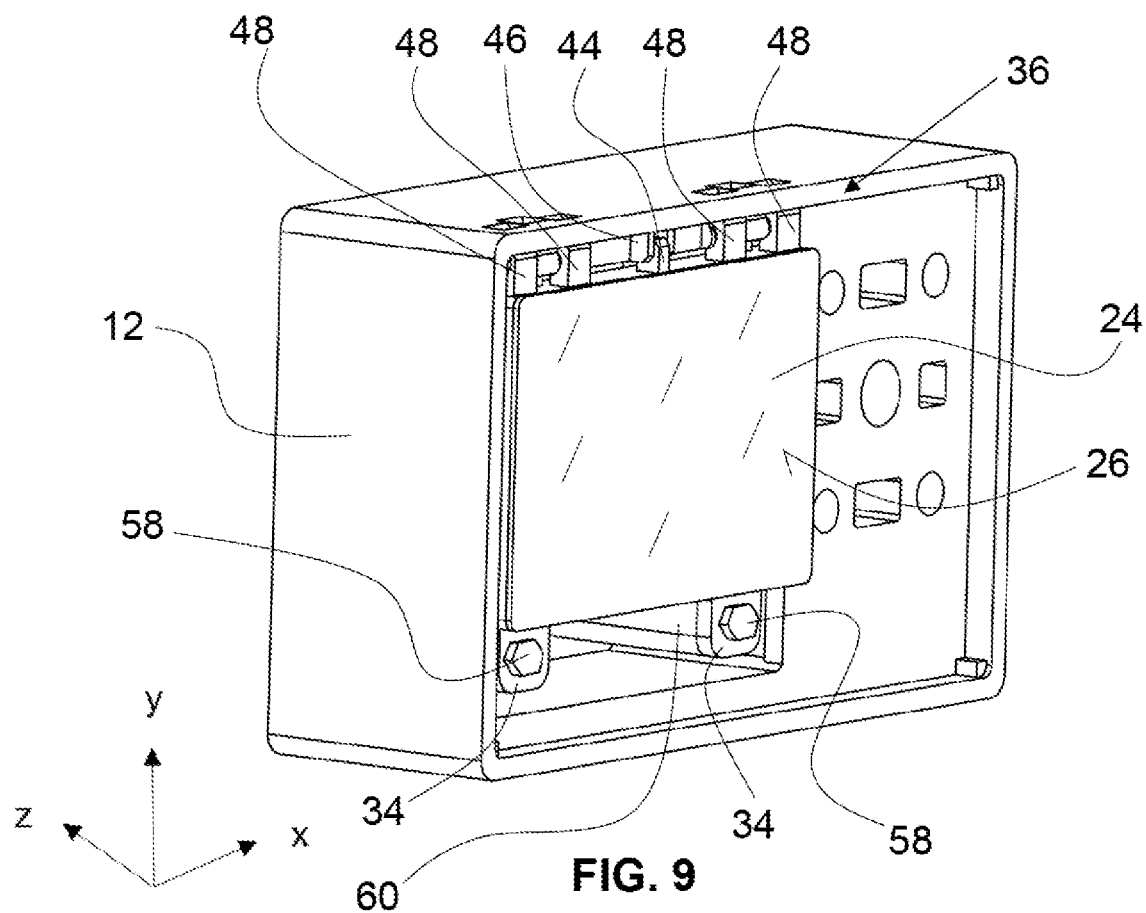
Figure 10:
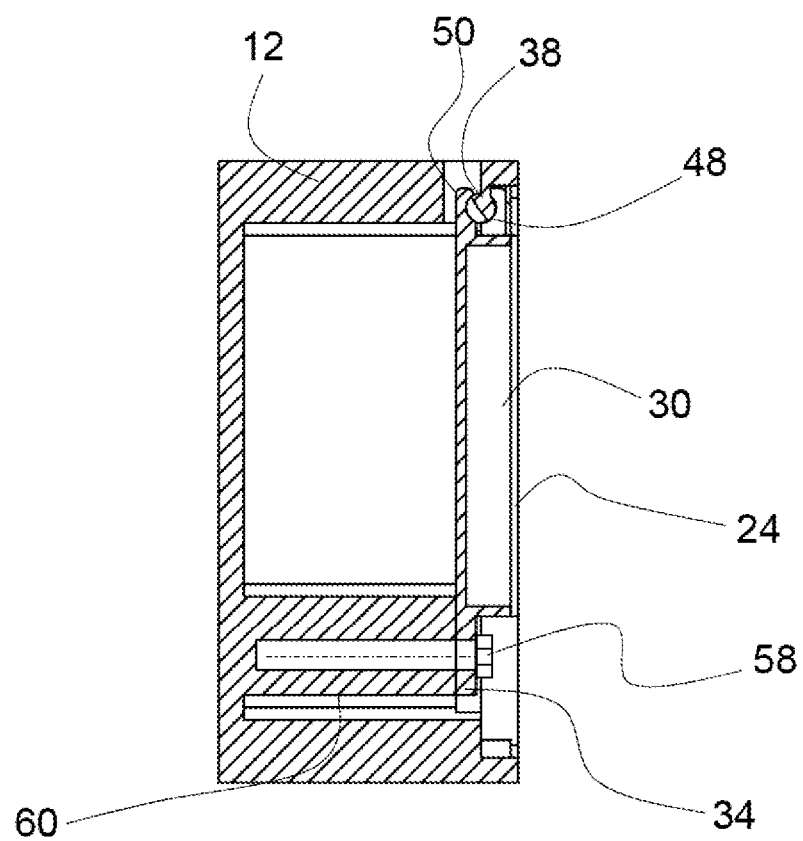
Figure 11:
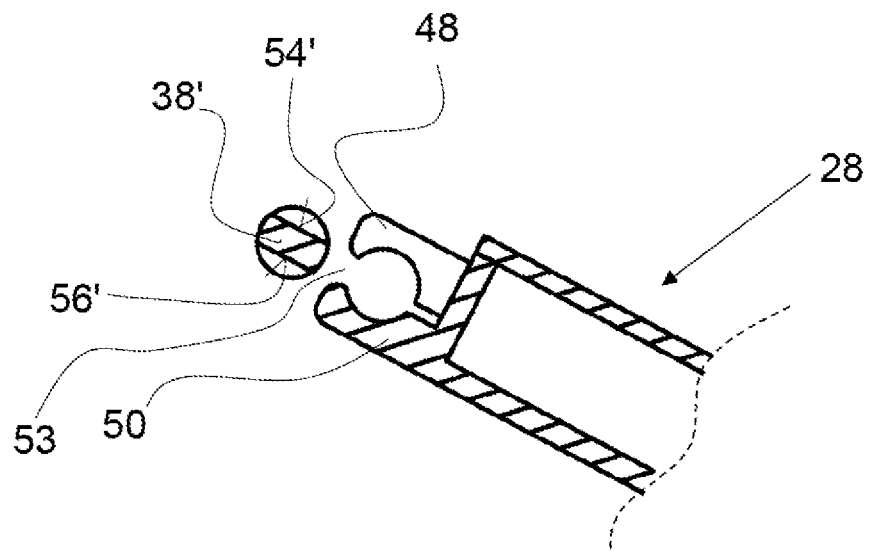
Figure 12:
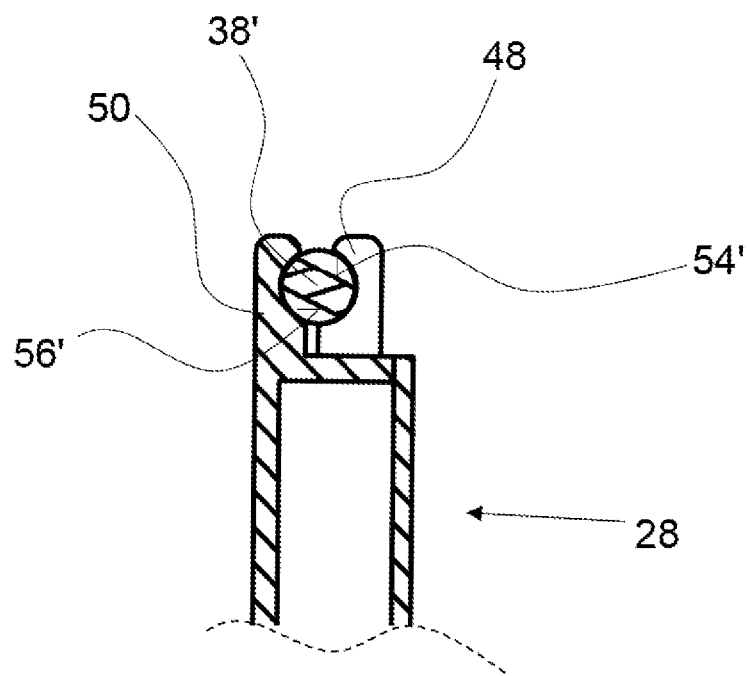

Hereunder the invention will be described in detail on the basis a several exemplary embodiments with reference to the drawing in which:

FIG. 1 shows a perspective view of the front side of an operating unit according to an exemplary embodiment of the invention, FIG. 2 shows an exploded view illustrating the components of the operating unit primarily relevant to the invention, FIGS. 3 to 10 show various states and relative arrangements of the holding part holding the display, and the housing before as well as in the assembly position and after pivoting into the installation position, FIGS. 11 and 12 show schematic diagrams of the hinge, adapted to be stuck together in the preassembly position of the holding part and be inseparable in the installation position, between the holding part and the housing for the operating unit of FIGS. 2 to 10, and FIGS. 13 to 16 show two further exemplary embodiments of the hinge, adapted to be stuck together in the preassembly position and be inseparable in the installation position, between the holding part and the housing.

FIGS. 1 and 2 show a perspective view as well as an exploded view of the essential components of an operating unit 10 according to an exemplary embodiment of the invention. The operating unit 10 comprises a housing 12 at whose front side a front panel 14 comprising a recess 16 is located. At the front panel 14 various manually operable operating elements, such as operating keys 18, buttons 20 and e.g. a rotary/push controller 22, are located. However, this type of operating elements will not be dealt with in detail below since the assembly of a display 24 whose display area 26 is positioned behind the front panel 14 in the installation position is the essential feature of the invention.

FIG. 2 shows that the display 24 is held by a holding part 28 which comprises a holding shell or a holding frame 30 having two bearing shell assemblies 32 and two fixing lugs as abutment elements 34. The bearing shell assemblies 32 and the abutment elements 34 as well as the holding part 28 form part of a fastening device 36 which additionally comprises two bar-shaped parts 38 stationarily arranged in the housing 12 (for the sake of convenience, hereunder referred to as "bar" or "bars", respectively) which are aligned with each other in the longitudinal extension and define a bearing axle 40 which cooperates with the bearing shell assemblies 32, as will be described below. The bar-shaped part(s) 38 and the bearing shell assembly 32 can be arranged such that they are inversely assigned to the housing 12 and the holding part 28 in comparison to what has been described above. The operating unit 10 further comprises a positioning element assembly 42 including an axial positioning protrusion 44 at the holding part 28 and two positioning abutment elements 46 at the housing 12 (or vice versa), the function of which will be described below.

Each bar-shaped part 38 can be continuously configured or comprise individual separate portions which are aligned with each other in the extension of the bearing axle 40, wherein the individual portions each comprise one of the flattened portions 54, 56 or a plurality of flattened portions 54, 56.

Figure 3:
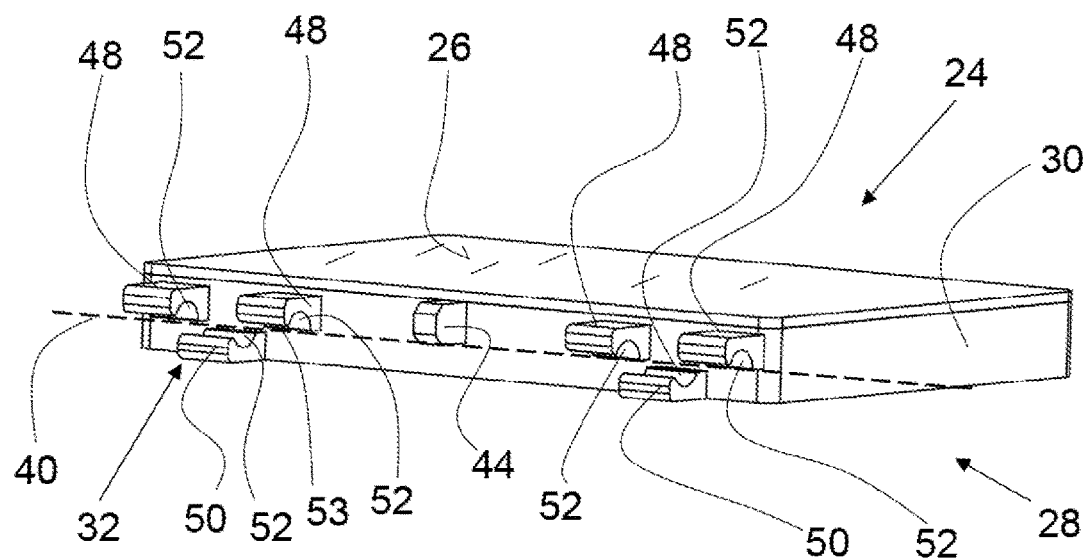
Figure 4:
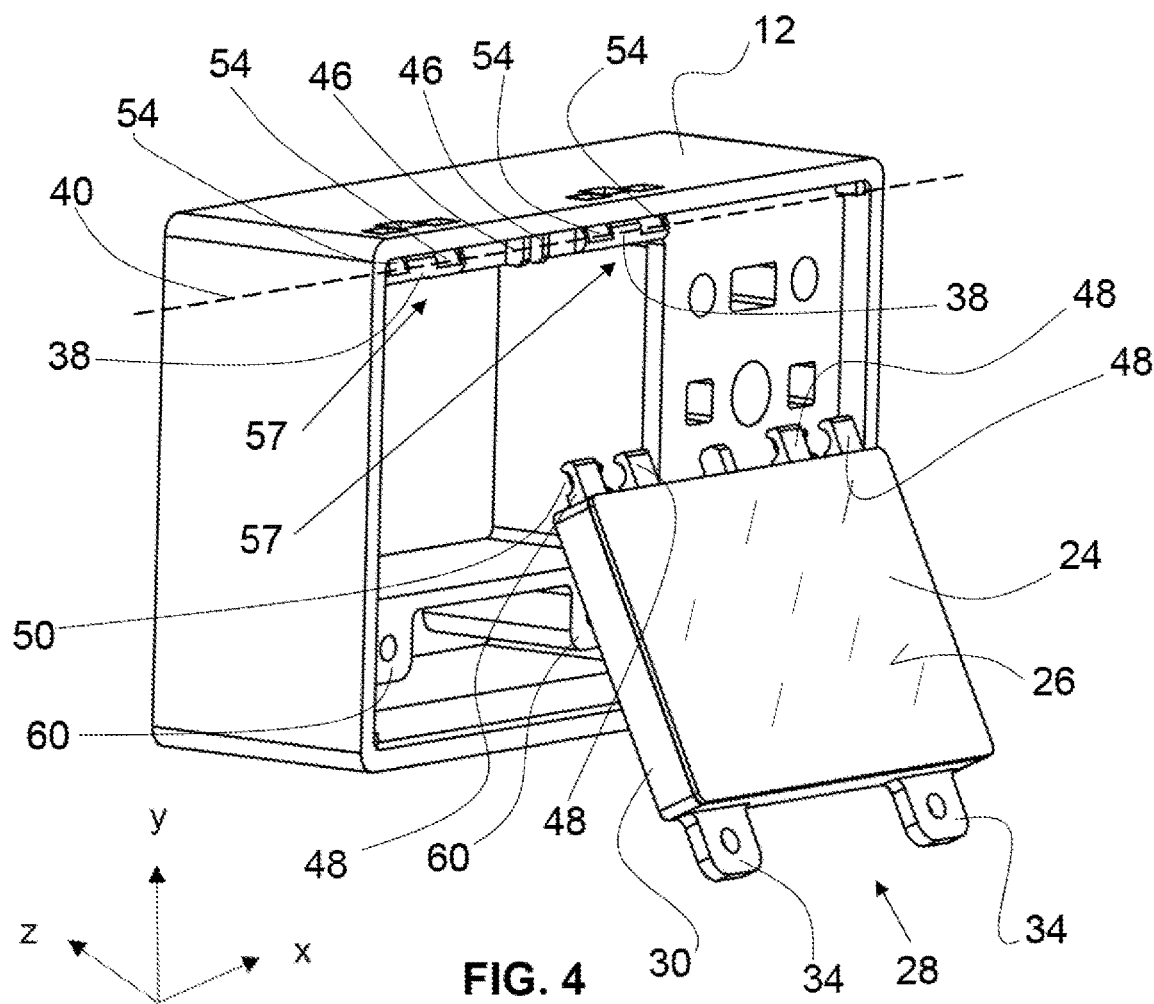
Figure 5:
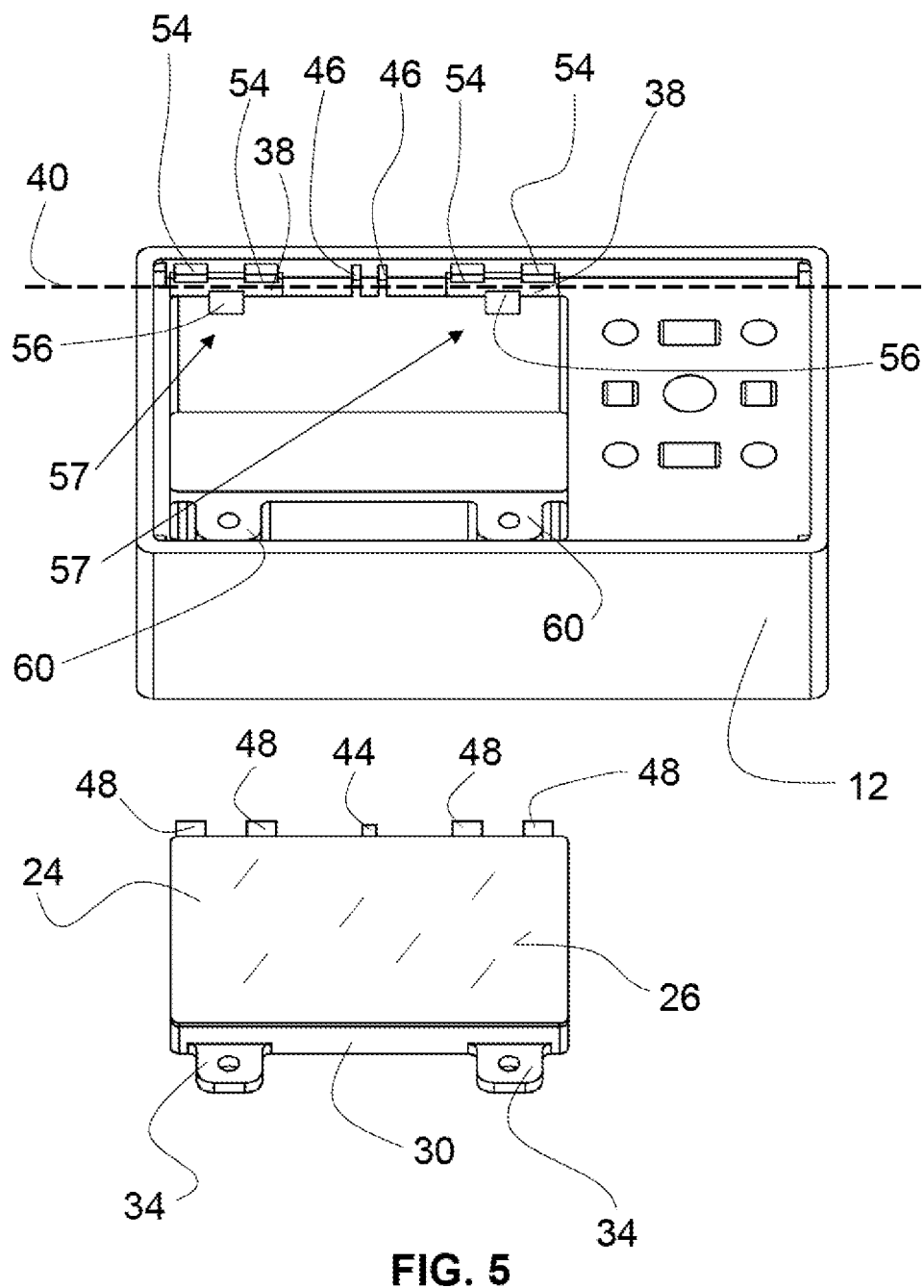
Figure 6:
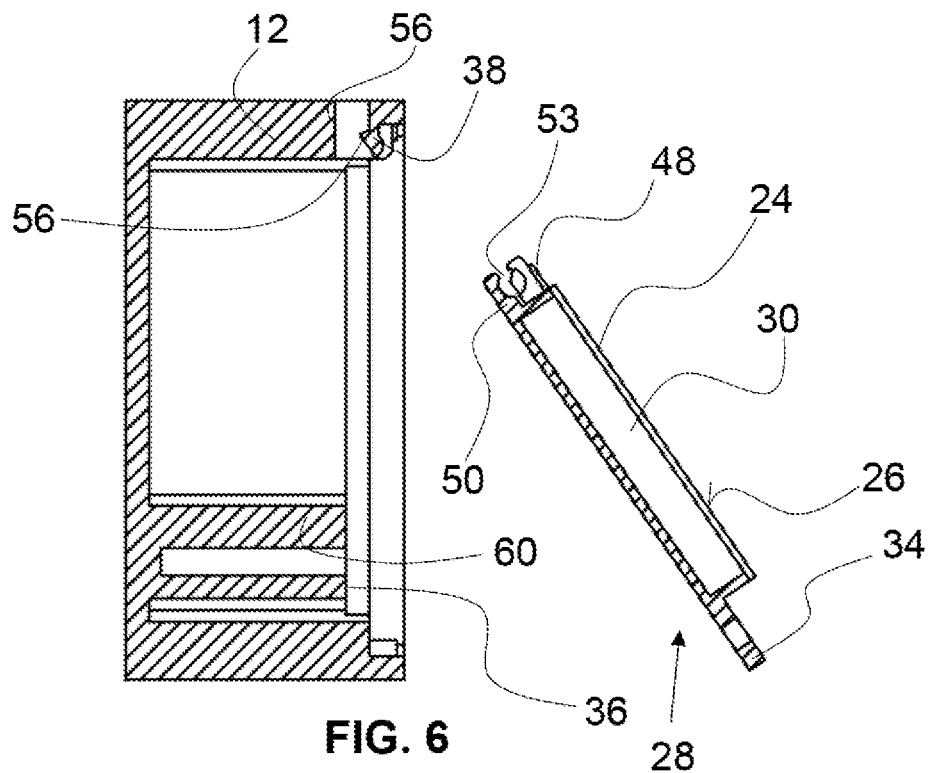

As can be seen in FIG. 3, for example, the two bearing shell assemblies 32 each comprise a group of gripping-around protrusions projecting from the holding part 28, wherein two first gripping-around protrusions 48 are arranged at a distance to each other, and a second gripping-around protrusion 50 is positioned on the opposite side and thus diametrally opposite in relation to the bearing axle 40 between these two first gripping-around protrusions 48 leaving a gap between them. Each gripping-around protrusion 48 comprises a circular-cylindrical portion of a bearing shell assembly 52, wherein, when viewing the bearing shell assembly 32 in the direction of the arrow in FIG. 3, the gripping-around protrusions 48, 50 of each bearing shell assembly 32 has a C-shaped configuration extending over more than 180° and in particular less than 270° and defines a mounting opening 53.

Figure 7:
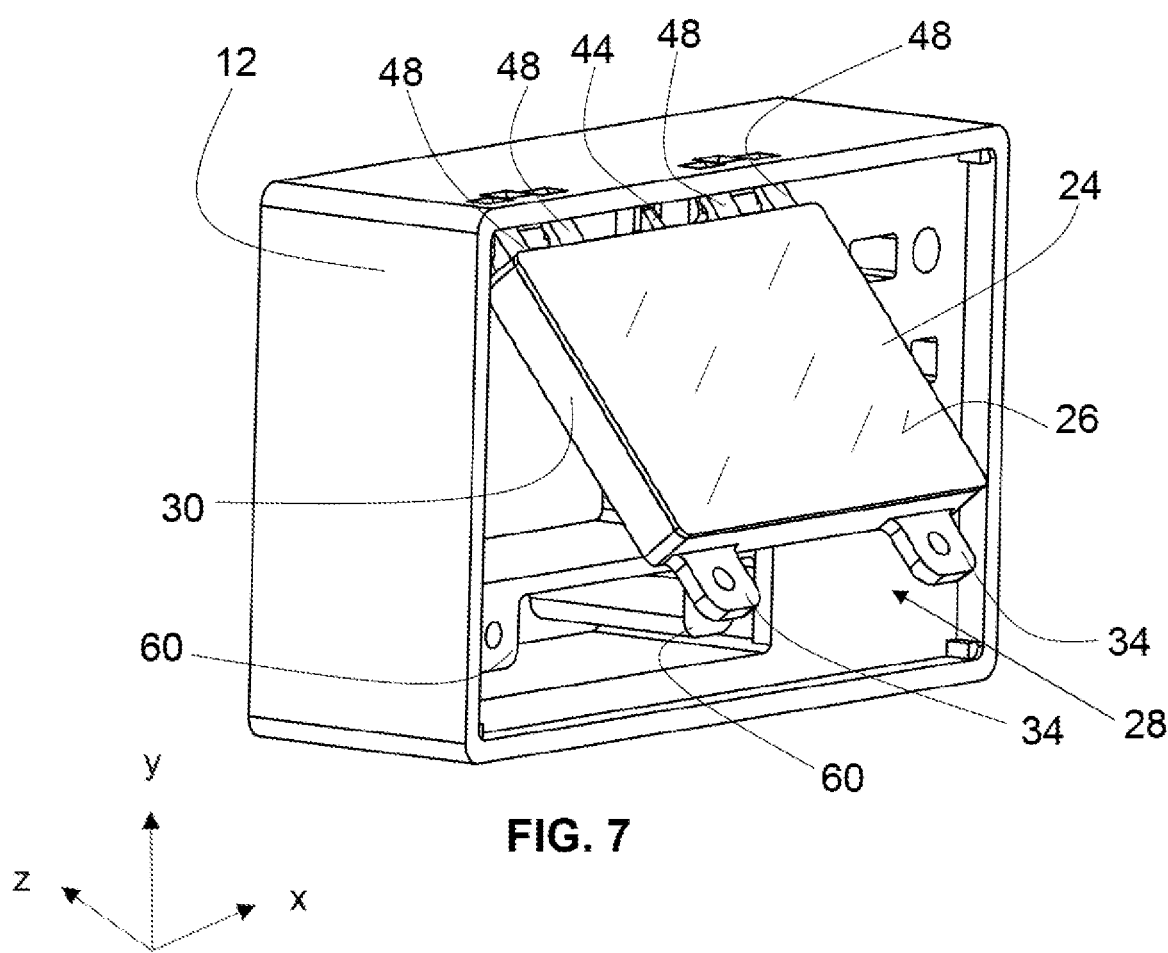
Figure 8:
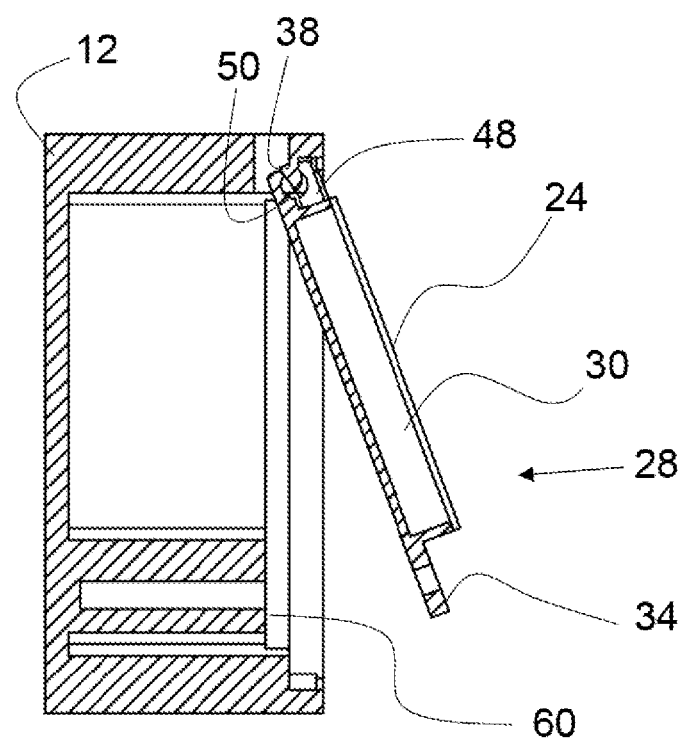

The figures indicate that the two bars 38 comprise flattened portions 54, 56 corresponding to the positions of the three gripping-around protrusions 48, 50 of each bearing shell assembly 32 which flattened portions, in their entirety, constitute mounting portions 57 of the bars 38. Thus, each bearing shell assembly can be laterally mounted on one of the bars 38, as shown in FIGS. 3 to 8. FIGS. 3 to 6 show various views in which the holding part 28, in its preassembly position, is mounted on the bearing axle 40. For this purpose, the holding part 28 is laterally mounted on the two bars 38 in an inclined manner and in an inclined orientation relative to the front side of the housing 12, wherein the gripping-around protrusions 48, 50 of each bearing shell assembly 32 grip around both sides of the respective bar 38. When the bars 38 have been mounted, the situation illustrated in FIGS. 7 and 8 is realized. Subsequently, the holding part is pivoted from this preassembly position into the installation position, as indicated by the arrows in FIGS. 7 and 8. In the installation position, the holding part 28 assumes the state illustrated in FIGS. 9 and 10.

As can in particular be seen in FIGS. 9 and 10, the holding part 28 is positioned in the Y- and Z-extension of the coordinate system of FIG. 9. The holding part 28 is fixed to the housing 12 by means of fastening elements 58 (indicated in FIG. 10) which define the abutment elements 34 of the holding part 28 relative to the abutment elements 60 in/at the housing 12. Here, the axial positioning protrusion 44 of the positioning element assembly 42 is immersed between the two positioning abutment elements 46, as can be seen in FIG. 9.

In FIGS. 11 and 12 the principle of the hinge adapted to be stuck together, as used for assembly of the holding part 28 and the housing 12 according to the invention, is schematically illustrated. The bar 38' comprises opposite first and second flattened portions 54', 56' with two first flattened portions 54' being arranged side by side in pairs on one side, wherein the second flattened portion 56' is arranged on the opposite side between these first flattened portions 54' leaving a gap between them. In the preassembly position of the holding part 28 the corresponding gripping-around protrusions 48, 50 can be slid on these flattened portions 54', 56', then serve as a pivot bearing for pivoting the holding part 28 into the installation position and grip around the bar 38' when the holding part 28 is in its installation position (see FIG. 12).

The two situations (preassembly position and installation position) described above are shown in FIGS. 13 and 14, and 15 and 16, respectively, for two other configurations of the bar.

Figure 13:
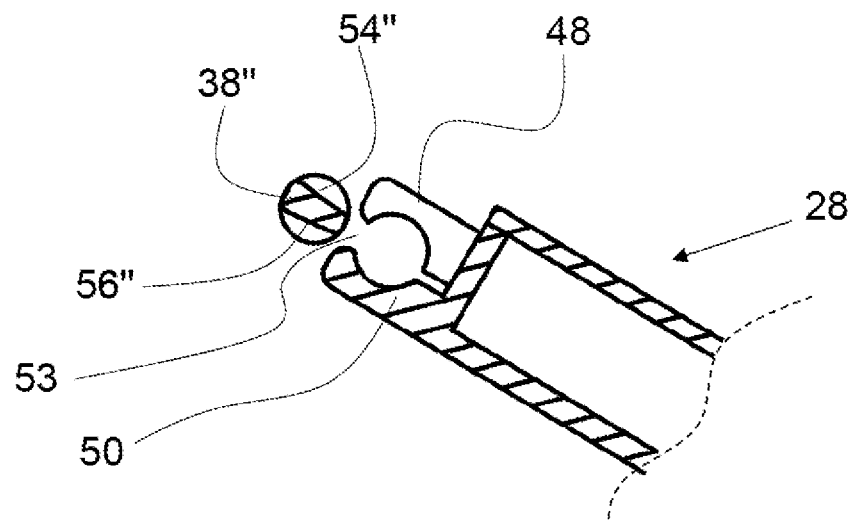
Figure 14:
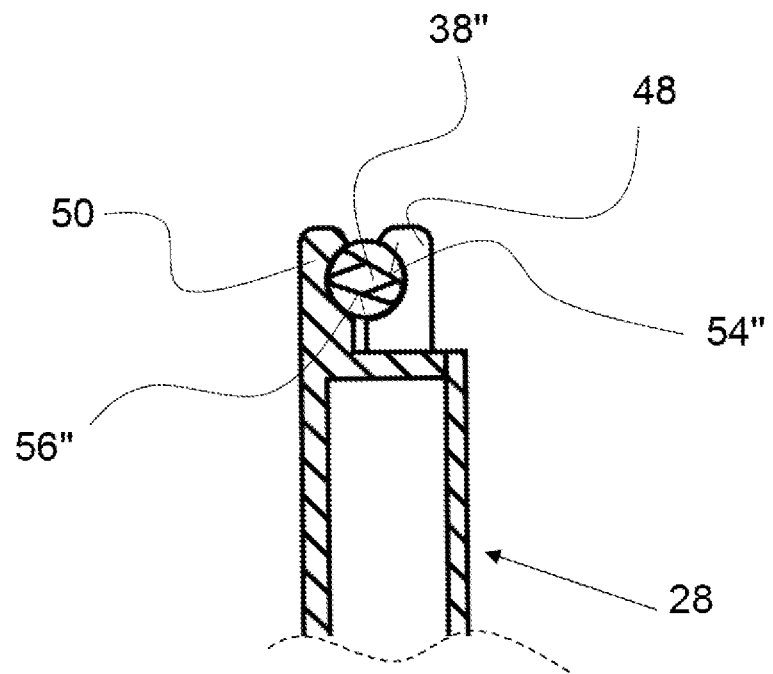

In FIGS. 13 and 14 the bar 38' also comprises flattened portions 54", 56" which, however, in contrast to those of the exemplary embodiment illustrated in FIGS. 11 and 12, do not extend in parallel but at an angle to each other.

Figure 15:
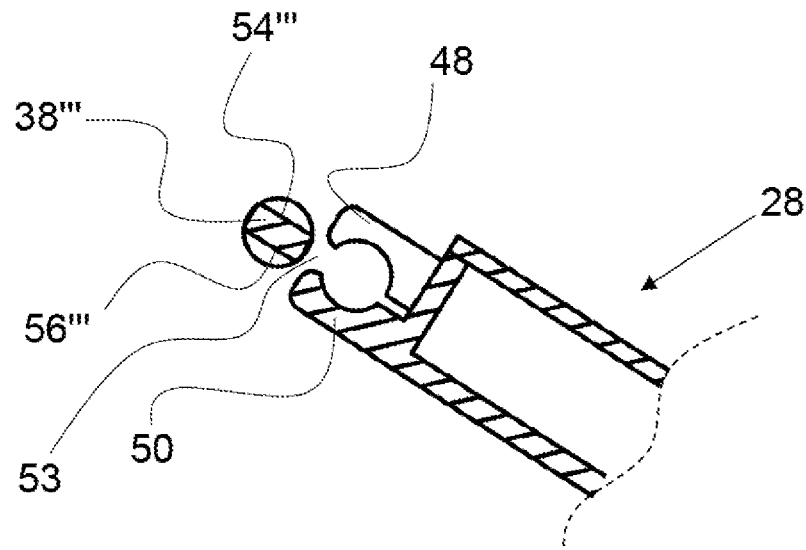
Figure 16:
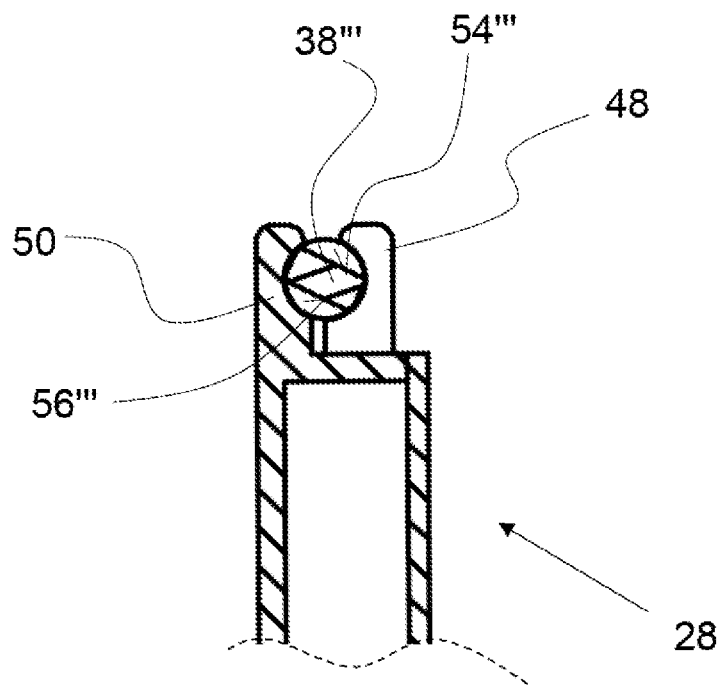

FIGS. 15 and 16 show an exemplary embodiment of a bar 38''' which has a square section. Here, the flattened portions 54''' and 56''' extend in parallel to each other and are diametrally opposite to each other and thus similar to those of the exemplary embodiment of FIGS. 11 and 12. Here, the diagonal of the square cross-section is equal to the diameter of the circular-cylindrical bearing shell assembly 52.

LIST OF REFERENCE NUMERALS

10 Operating unit
12 Housing

14 Front panel
16 Recess
18 Operating key
20 Operating button
22 Rotary/push controller
24 Display
26 Display area
28 Holding part
30 Holding frame
32 Bearing shell assembly
34 Abutment element at the holding part
36 Fastening device
38 Bar
38' Bar
38" Bar
38''' Bar
40 Bearing axle
42 Positioning element assembly
44 Axial positioning protrusion
46 Positioning abutment element
48 Gripping-around protrusion
50 Gripping-around protrusion
52 Bearing shell area
53 Mounting opening
54 Flattened portion
54' Flattened portion
54" Flattened portion
54''' Flattened portion
56 Flattened portion
56' Flattened portion
56" Flattened portion
56''' Flattened portion
57 Mounting portion
58 Fastening element
60 Abutment element at the housing

The invention claimed is:

1. An operating unit for a vehicle, comprising
a housing having a front panel comprising a recess,
a display accommodated in the housing and having a display area which is arranged in the or behind the recess, and
a fastening device for fastening the display in the housing,
wherein the fastening device comprises a holding part holding the display,
wherein the holding part is arranged in the housing so as to be pivotable between a preassembly position and an installation position in which the display is located in the or behind the recess of the front panel,
wherein the housing—or alternatively the holding part—comprises a bearing axle which is constituted by at least one bar-shaped part arranged in the housing—or alternatively in the holding part,
wherein the holding part—or alternatively the housing—comprises at least one bearing shell assembly having at least two gripping-around protrusions adapted to be mounted on the at least one bar-shaped part, which gripping-around protrusions define a circular-cylindrical bearing shell area for abutting on the at least one bar-shaped part, said bearing shell area extending over more than 180° and less than 270° and defining a mounting opening for mounting the bearing shell assembly on the at least one bar-shaped part,
wherein the at least one bar-shaped part comprises, along its longitudinal extension, in at least one mounting portion a circumferential area having an outer contour which deviates from the shape complementary to the bearing shell area of the gripping-around protrusions of the at least one bearing shell assembly,
wherein the at least one bar-shaped part is arranged in the housing—or alternatively the at least one bearing shell assembly at the holding part—so as to be oriented in such a way that the at least one bearing shell assembly, in the preassembly position of the holding part, is adapted to be mounted on the mounting portion of the at least one bar-shaped part and is pivotable from the preassembly position into the installation position in which the at least one bearing shell assembly grips around the at least one bar-shaped part within its mounting portion so as to be undetachable,
wherein the installation position of the holding part is defined by abutting elements of the housing and the holding part, with the abutting elements abutting on each other, and
wherein the fastening device comprises at least one fastening element for fixing the holding part, in its installation position, in and/or at the housing.

2. The operating unit according to claim 1, wherein the at least one bar-shaped part comprises, within its mounting portion, an outer contour deviating from the circular-cylindrical circumferential shape due to at least one flatted portion.

3. The operating unit according to claim 2, wherein the at least one bar-shaped part comprises, within its mounting portion, an outer contour deviating from the circular-cylindrical circumferential shape due to at least two flattened portions.

4. The operating unit according to claim 3, wherein two flattened portions are arranged diametrally opposite to each other.

5. The operating unit according to claim 1, wherein the at least one bar-shaped part has a polygonal circumferential area in its mounting portion, wherein the longest distance line, extending through the center axis of the at least one bar-shaped part, between two opposite outer corners of the polygonal circumferential area is equal to or essentially equal to the diameter defined by the circular-cylindrical bearing shell area of the gripping-around protrusions of the at least one bearing shell assembly.

6. The operating unit according to claim 1, wherein the gripping-around protrusions of the at least one bearing shell assembly essentially define a C-shape as seen in an extension of the bearing axle.

7. The operating unit according to claim 1, wherein the gripping-around protrusions of the at least one bearing shell assembly are opposite to each other and at least one pair of such gripping-around protrusions exists.

8. The operating unit according to claim 1, wherein the gripping-around protrusions are arranged axially offset from each other, as seen in an extension of the bearing axle, wherein within the distance area between two neighboring first gripping-around protrusions at least one opposite second gripping-around protrusion is arranged.

9. The operating unit according to claim 1, wherein a positioning element assembly for positioning the holding element and the housing relative to each other in the longitudinal extension of the at least one bar-shaped part when the holding part assumes the installation position, wherein the positioning element assembly comprises at the housing—or alternatively at the holding part—two neighboring positioning abutment elements between which, in the installation position of the holding part, an axial positioning protrusion arranged at the holding part—or alternatively at the housing—is adapted to be immersed.

10. The operating unit according to claim 1, wherein the bearing axle is constituted by two bars aligned with each other, wherein gripping-around protrusions of a bearing shell assembly are associated with each bar-shaped part, and/or that the installation position of the holding part is defined by two pairs of cooperating abutment elements at the holding part and the housing.

11. The operating unit according to claim 9, wherein the positioning element assembly is arranged between two bars or between two pairs of abutment elements.

12. The operating unit according to claim 1, wherein cooperating guiding areas at the holding part and at the housing for supporting the orientation of the holding part when the gripping-around protrusions of the at least one bearing shell assembly are mounted on the at least one bar-shaped part for the holding part to assume its preassembly position.

\* \* \* \* \*